United States Patent [19]
Streiff et al.

[11] Patent Number: 4,759,910
[45] Date of Patent: Jul. 26, 1988

[54] DISTRIBUTOR FOR A LIQUID-LIQUID EXTRACTION OR REACTION COLUMN

[75] Inventors: Felix Streiff, Winterthur; Peter Mathys, Neuhausen, both of Switzerland

[73] Assignee: Sulzer Brothers Limited, Winterthur, Switzerland

[21] Appl. No.: 5,425

[22] Filed: Jan. 20, 1987

[30] Foreign Application Priority Data

Feb. 3, 1986 [CH] Switzerland .............................. 403/86

[51] Int. Cl.⁴ .............................................. B01F 3/08
[52] U.S. Cl. ..................................... 422/256; 261/97; 261/123
[58] Field of Search .................... 422/256; 261/97, 123

[56] References Cited

U.S. PATENT DOCUMENTS

| | | | |
|---|---|---|---|
| 1,407,258 | 2/1922 | Conners | 261/123 |
| 3,011,723 | 12/1961 | Van Weele | 261/112.1 |
| 3,268,217 | 8/1966 | Goitein | 261/110 |
| 3,290,025 | 12/1966 | Engalitcheff, Jr. | 261/110 |
| 3,424,443 | 1/1969 | Thayer | 261/123 |
| 3,820,353 | 6/1974 | Shiraishi et al. | 261/DIG. 11 |
| 3,929,421 | 12/1975 | Werges | 422/256 |
| 4,019,869 | 4/1977 | Morris | 422/256 |
| 4,267,978 | 5/1981 | Manteufel | 261/97 |
| 4,421,696 | 12/1983 | Graue et al. | 261/123 |
| 4,474,714 | 10/1984 | Downs | 261/97 |
| 4,479,909 | 10/1984 | Streuber | 261/97 |
| 4,557,877 | 12/1985 | Hofstetter | 261/97 |

FOREIGN PATENT DOCUMENTS

| | | | |
|---|---|---|---|
| 2945103 | 5/1981 | France | 261/97 |
| 668293 | 3/1952 | United Kingdom | 11/112.1 |
| 1047502 | 10/1983 | U.S.S.R. | 261/97 |

OTHER PUBLICATIONS

Sulzer pamphlet d/22.12.06.20, Trennkolonnen fur Destillation und Absorption, pp. 32, 33.

Primary Examiner—Tim Miles
Attorney, Agent, or Firm—Kenyon & Kenyon

[57] ABSTRACT

The tubular arm distributor is provided with at least one tubular arm having metering orifices through which a dispersed phase can be metered and a horizontal box-like element which extends over the metering orifices to define a chamber for receiving the dispersed phase. The box-like element has exit orifices in the form of slots along the side walls to distribute the dispersed phase into the continuous phase.

18 Claims, 4 Drawing Sheets

DISTRIBUTOR FOR A LIQUID-LIQUID EXTRACTION OR REACTION COLUMN

This invention relates to a tubular-arm distributor for use in liquid-liquid extraction or reaction columns.

As is known, in tray columns in which agitators may be disposed between the trays, it is conventional for a dispersed phase to be supplied through a single dispensing station. In the case of columns which employ regular or statistical packings, measurement of axial re-mixing have shown that re-mixing is governed decisively by uniform distribution of the dispersed phase over the column cross-section. However, conventional tubular-arm distributors such as those described in Sulzer pamphlet d/22.12.06.20 "Trennkolonnen fur Destillation and Absorption" on pages 32 and 33 are not suitable for the distribution of a dispersed phase in columns employing regular or statistical packings.

Generally, the known tubular-arm distributors have tubular arms which extend over the column cross-section or box-like elements which are open at the top and which are formed in the lower regions with exit orifices for the liquid to be distributed and which are fed from the top feed duct. In such cases, the feed duct has been formed with only a single exit orifice for each tubular arm.

If the liquid is to be distributed uniformly in distributors of this kind, the exit speed from the exit orifices must be in a range of from four to ten times the speed in a tubular arm. Consequently, exit velocities from the tubular arms are high. Thus, the drops which evolve in the exit of a dispersed phase into an ambient continuous phase and in the impingement on regular or statistical packings disposed in the column are so small as to lead to premature flooding and/or substantial entrainment, i.e. entrainment of droplets with the continuous phase.

In the case of open box distributors where such are used instead of tubular arms, impingement on the liquid surface and the cross flow present below the feed stations lead to emulsification and to the evolution of small secondary droplets.

Accordingly, it is an object of the invention to provide a distributor for a dispersed phase in a column which provides uniform distribution without impingement phenomena occurring.

It is another object of the invention to be able to distribute a dispersed phase in a column without the formation of secondary droplets.

It is another object of the invention to improve the efficiency of operation of a column employing regular or statistical packings through the use of an improved distributor.

Briefly, the invention provides a distributor which can be used for liquid-liquid extraction columns, and liquid-liquid reaction columns. The distributor is constructed of at least one tube for receiving a flow of medium and which has a plurality of longitudinally disposed metering orifices for dispensing the medium and a horizontally disposed box-like element which extends over and along the tube in facing relation to the metering orifices in order to receive and contain the flow of medium therein. This box-like element also has a plurality of laterally disposed exit orifices set back from the metering orifices in the direction of flow of the medium from the metering orifices.

Where the medium is a dispersed phase which is lighter than a continuous phase flowing through a column, the box-like element is disposed around the top part of the tubular arm and the metering orifices are disposed above the exit orifices. When the dispersed phase is the heavier phase, the converse applies, that is, the box-like element extends around the bottom part of the tubular arm and the exit orifices are disposed above the metering orifices.

These and other objects and advantages of the invention will become more apparent from the following detailed description taken in conjunction with the accompanying drawings wherein.

Figure 1:
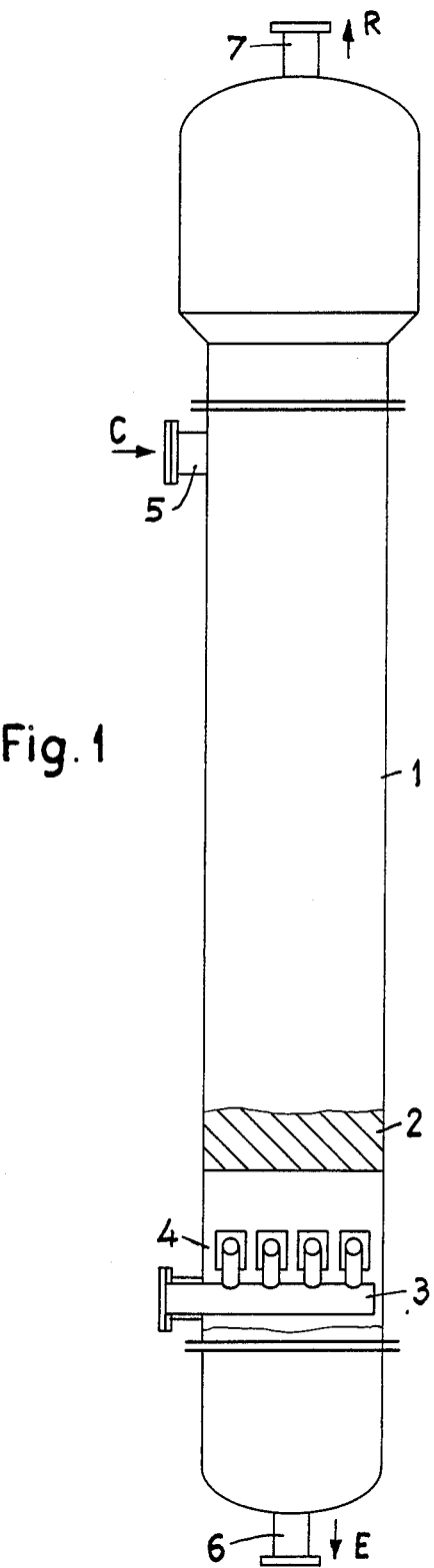
FIG. 1 illustrates a partial side elevational view of a column employing a distributor in accordance with the invention.

Referring to FIG. 1, an extraction column 1 is provided with a plurality of regular packings 2, only one of which is shown for simplicity. In this case, the column is to be used for extracting acetone from a water-acetone mixture with the use of toluene.

As indicated in FIG. 1, the column is provided with a distributor at the lower end through which toluene as the lighter phase can be introduced. As indicated, the distributor includes a main feed tube 3 and a tubular-arm distributor 4 from which the dispersed lighter phase can be uniformly distributed to the bottom end of the packing 2. A supply spigot 5 is disposed near the top of the column 1 for the introduction of a heavier continuous phase C, for example, water/acetone. A spigot 6 is also provided at the bottom of the column 1 for the removal of a product E, in the form of water. In similar fashion, a spigot 7 is provided at the top of the column for removal of a top product R, i.e. acetone/carrying toluene.

The column 1 may have a diameter in excess of 1 meter.

Figure 2:
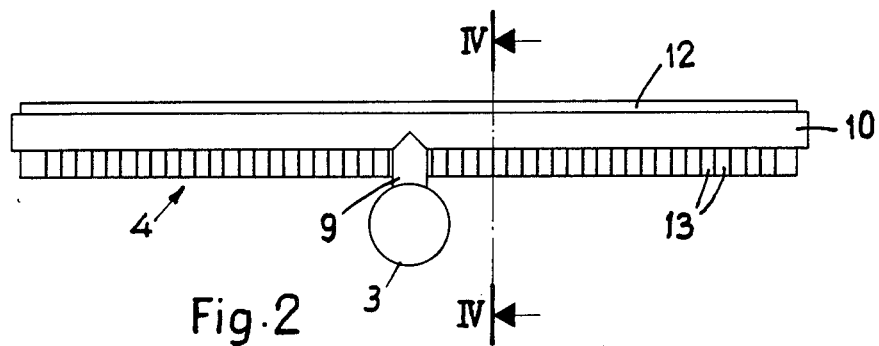
FIG. 2 illustrates a view taken on line II—II of FIG. 3.
Figure 3:
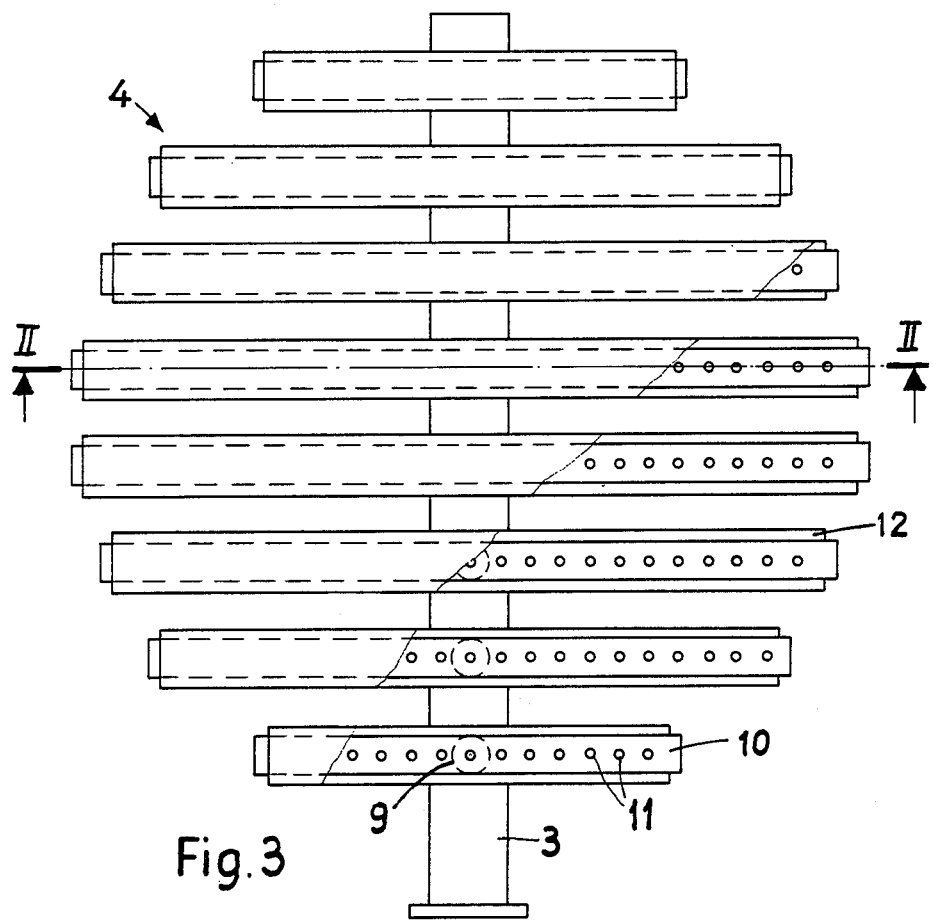
FIG. 3 illustrates a plan view of a tubular arm distributor constructed in accordance with the invention.
Figure 4:
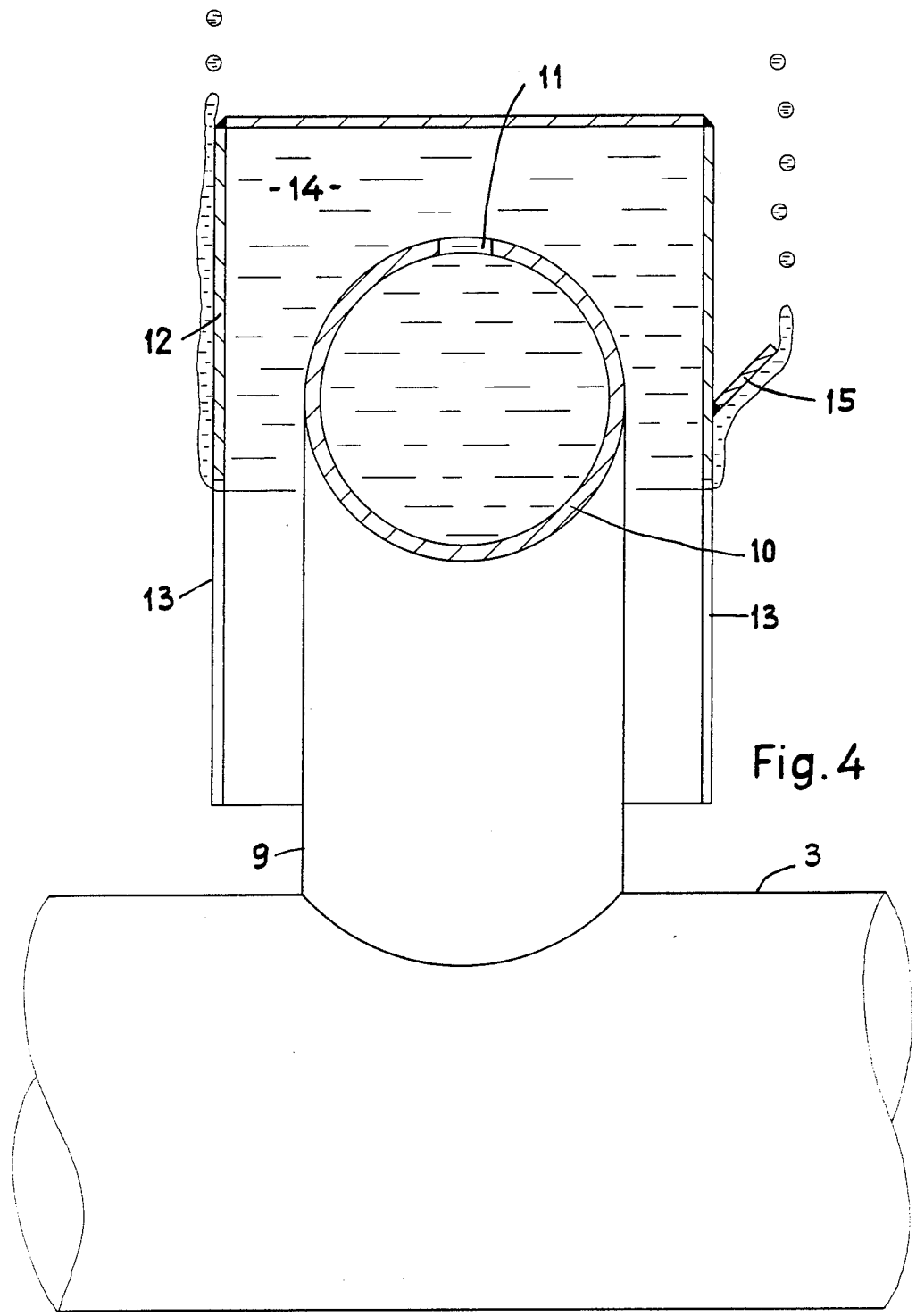
FIG. 4 illustrates a view taken on line IV—IV of FIG. 2.

Referring to FIGS. 2 to 4, the distributor 4 includes the main tube 3 which extends over the column diameter. In addition, a plurality of distributing tubes 9 are connected to the feed tube 3 in order to receive the medium and are vertically disposed. In addition, a plurality of tubular arms 10 are connected to the tubes 9 in order to receive and distribute the medium. Of note, the tubular arms 10 may be of any suitable cross-section, for example, square or rectangular as well as circular. In addition, each tubular arm 10 is formed at the top with metering or dispensing orifices 11. As indicated in FIG. 3, the orifices 11 are longitudinally disposed for the dispensing of the medium therefrom.

The distributor 4 also includes a plurality of horizontally disposed box-like elements 12. Each element 12 extends over a respective tubular arm 10 in facing relation to the orifice 11 in order to receive and contain the flow of medium therein. To this end, each element 12 is closed at the opposite ends and has side walls as indicated in FIG. 4 which depend downwardly to opposite sides of the tubular arm 10. In addition, each side wall is provided with laterally disposed exit orifices in the form of slots 13 to permit an outflow of the medium. As indicated in FIG. 4, each box-like element 12 forms a collecting chamber 14 for the medium to be dispersed from the tubular arms 10.

The box-like elements 12 need not be continuous units but may also be comprised of a number of parts. The advantage of using a plurality of parts for each tubular arm 10 is that the parts are simpler to align should an inclined position be required.

Since the medium to be dispersed is the lighter phase, for example, toluene in the case of water/acetone/toluene system, the elements 12 are disposed above the arms 10.

During operation, toluene issues at a relatively high speed through the metering orifices 11 which are of a diameter, for example, from 5 to 10 millimeters in order to avoid cogging by dirt, into the chamber 14. This feature alone is usually sufficient to insure a uniform coarse distribution over the column cross-section. However, the slots 13 in the side walls of the element 12 provide for fine distribution. As indicated, the slots 13 are disposed to the bottom part of the element 12 and/or set back from the metering orifices 11 relative to the direction of flow. Thus, dispersed phase is always present in a continuous form around the orifices 11. Metering can therefore proceed at a high rate of exit without any evolution of small drops.

If the metering orifices 11 are disposed relatively close together in the tubular arms 10, for example, at the rate of one orifice 11 per four slots 13, crossflow in the box-like elements 12 can be obviated.

As indicated in FIG. 4, the discharge from the box-like element 12 proceeds very slowly and corresponds to the head of liquid arising at the slots 13. The production of unwanted small drops or even of emulsification is therefore obviated.

The arrangement of the slots 13 relative to the metering orifices 11 leads to a syphon-like seal so that the distributor can never be filled with the continuous phase which, in operation, extends around the distributor as would otherwise occur in previously known tubular-arm distributors. In order to definitively preclude the dispersed phase from engaging the outer wall of the elements 12, with resulting striation, deflecting means in the form of bent deflector plates 15 are disposed at the edges of the slots 13 in the elements 12 in order to deflect the flow of medium from the elements 12. Advantageously, the deflector plates 15 can be provided with jagged edges. If required, the deflecting means may be in the form of wires which are disposed on the side walls of the box-like elements 12.

Figure 5:
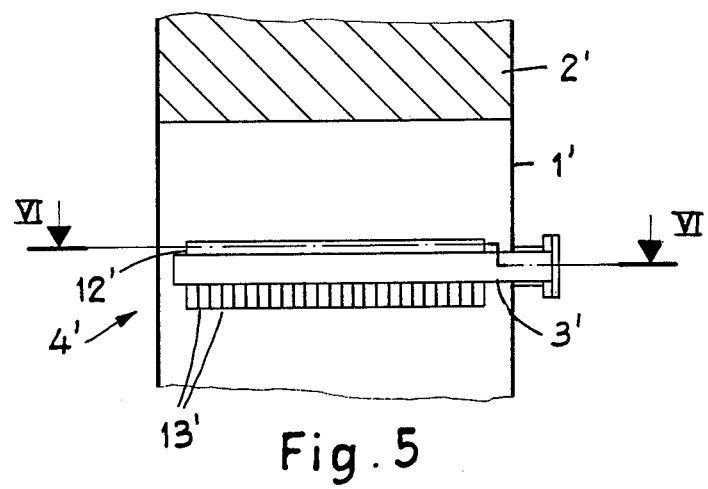
FIG. 5 illustrates a view of a modified distributor taken on line V—V of FIG. 6.
Figure 6:
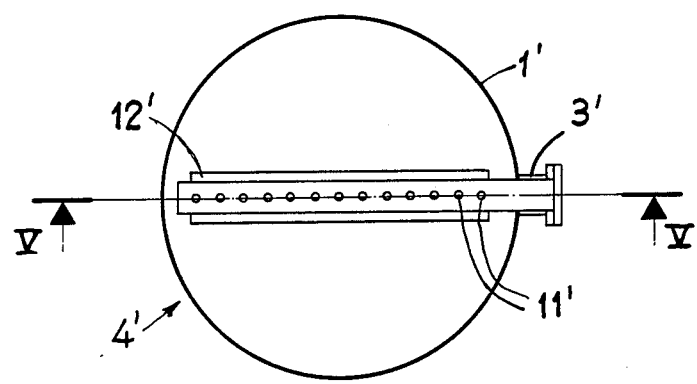
FIG. 6 illustrates a view taken on line VI—VI of FIG. 5.

Referring to FIGS. 5 and 6, wherein like reference characters indicate like parts as above, a column 1' may be provided with a modified distributor 4' which is formed of a single tubular arm 10' surrounded to a similar extent, as above described, by a box-like element 12' formed with lateral slots 13'.

Various modifications can be made in the distributor without departing from the scope of the invention. For example, the metering orifices may be in the form of bores or of cut-out slots. Also, the exit orifices in the elements 12 may be in the form of rows of apertures with one row disposed above an adjacent row. Further, the arms 10 and elements 12 may be made of sheet metal or plastic.

The invention thus provides a tubular arm distributor which can be utilized to uniformly distribute a dispersed phase in columns such as liquid-liquid extraction columns and reaction columns.

The invention also provides a tubular arm distributor of relatively simple construction which enables a dispersed phase to be metered at high exit velocities without evolution of small drops.

What is claimed is:

1. A distributor for distributing a dispersed phase into a continuous phase in a liquid-liquid column comprising
   at least one tubular arm for receiving a flow of a dispersed phase, said arm having a plurality of longitudinally disposed metering orifices for dispersing the dispersed phase at relatively high speed therefrom; and
   a horizontally disposed box-like element extending above, over and along said arm in spaced facing relation to said orifices to receive and contain the flow of dispersed phase therein, said element having a plurality of laterally disposed exit orifices set back from said metering orifices in the direction of flow of the dispersed phase from said metering orifices to define a siphon-like seal therewith, said exit orifices being disposed to uniformly distribute the dispersed phase into the continuous phase.

2. A distributor as set forth in claim 1 wherein said element is of channel cross-section.

3. A distributor as set forth in claim 1 wherein each metering orifice is a bore in said tube.

4. A distributor as set forth in claim 1 wherein each metering orifice is a cut-out slot.

5. A distributor as set forth in claim 1 wherein said elements have a plurality of said exit orifices for each metering orifice.

6. A distributor as set forth in claim 1 wherein each exit orifice is a vertical slot.

7. A distributor as set forth in claim 1 which further comprises deflecting means on said element adjacent to said exit orifices to deflect the flow of medium from said element.

8. A distributor as set forth in claim 7 wherein said deflecting means include a plurality of bent sheet-metal members.

9. A distributor as set forth in claim 8 wherein each member has a jagged edge to deliver the flowable medium therefrom.

10. A distributor as set forth in claim 1 wherein said arm and said element are made of sheet metal.

11. A distributor as set forth in claim 1 wherein said arm and said element are made of plastic.

12. A distributor for a liquid-liquid column comprising
    a horizontal main feed tube for supplying a flow of dispersed phase;
    a plurality of vertical distributing tubes connecting to said feed tube to receive the dispersed phase therefrom;
    a plurality of horizontal tubular arms, each said arm being connected to a respective distributing tube to receive the dispersed phase therefrom, each said arm having a plurality of longitudinally disposed metering orifices for dispensing the phase therefrom at relatively high speed; and
    a plurality of horizontally disposed box-like elements, each element extending over a respective arm in facing relation to said orifices to receive and contain the flow of dispersed phase therein, each element having laterally disposed exit orifices spaced downstream from said metering orifices relative to the direction of flow of the medium from said metering orifices to define a siphon-like seal therewith, said orifices being disposed to uniformly distribute the dispersed phase into the continuous phase.

13. A distributor as set forth in claim 12 wherein said arms are disposed above said feed tube, said metering orifices are at an upper surface of said arms and said elements are disposed over said respective arms.

14. A distributor as set forth in claim 13 wherein each element has side walls extending to below a respective arm and wherein said exit orifices define slots in said side walls.

15. A distributor as set forth in claim 13 which further comprises deflecting means on each element adjacent said exit orifices to deflect the flow of medium therefrom.

16. In combination;
a column having a supply spigot for introduction of a continuous phase therein and a spigot for removal of a product therefrom; and
a distributor disposed in said column for introduction of a dispersed phase into the continuous phase, said distributor including at least one tubular arm for receiving a flow of dispersed phase, said arm having a plurality of longitudinally disposed metering orifices for dispensing the dispersed phase therefrom at relatively high speed without evolution of small drops; and a horizontally disposed box-like element extending over and along said arm in spaced facing relation to said orifices to receive and contain the flow of dispersed phase therein, said element having a plurality of laterally disposed exit orifices set back from said metering orifices in the direction of flow of the dispersed phase from said metering orifices to define a siphon-like seal therewith, said orifices being disposed to uniformly distribute the dispersed phase into the continuous phase.

17. The combination as set forth in claim 1 wherein said dispersed phase is lighter than said continuous phase and wherein said box-like element is disposed above said tubular arm and said metering orifices are at an upper surface of said tubular arm.

18. In combination,
a column having a supply spigot for introduction of a continuous phase therein and a spigot for removal of a product therefrom; and
a distributor disposed in said column for introduction of a dispersed phase into the continuous phase, said distributor including a main feed tube for supplying a flow of dispersed phase, a plurality of distributing tubes connected to said feed tube to receive the dispersed phase therefrom, a plurality of tubular arms, each said arm being connected to a respective distributing tube to receive the dispersed phase therefrom, each said arm having a plurality of longitudinally disposed metering orifices for dispensing the dispersed phase therefrom; and a plurality of horizontally disposed box-like elements, each element extending over a respective arm in facing relation to said orifices to receive and contain the flow of dispersed medium therein, each element having laterally disposed exit orifices spaced downstream from said metering orifices relative to the direction of flow of the dispersed medium from said metering orifices to define a siphon-like seal therewith, said orifices being disposed to uniformly distribute the dispersed phase into the continuous phase.

* * * * *

UNITED STATES PATENT AND TRADEMARK OFFICE
CERTIFICATE OF CORRECTION

PATENT NO. : 4,759,910

DATED : July 26, 1988

INVENTOR(S) : FELIX STREIFF, et al

It is certified that error appears in the above-identified patent and that said Letters Patent is hereby corrected as shown below:

Column 1, line 17 "and" should be -und-
Column 2, line 62 "oriface" should be -orifices-
Column 3, line 16 "cogging" should be -clogging-
Column 6, line 3 "claim 1" should be -claim 16-

Signed and Sealed this

Tenth Day of January, 1989

Attest:

DONALD J. QUIGG

*Attesting Officer*  *Commissioner of Patents and Trademarks*